INVENTORS
NGUYEN VAN TRAN
DENIS KEHL

BY Paul M. Craig, Jr.
ATTORNEY

United States Patent Office 3,486,129
Patented Dec. 23, 1969

3,486,129
APPARATUS FOR THE CONTROLLED RELEASE OF A PLURALITY OF LASERS OR MASERS
Nguyen van Tran, Issy-les-Moulineaux, and Denis Kehl, Verrieres-le-Buisson, France, assignors to Compagnie Generale d'Electricite, Paris, France
Filed Apr. 20, 1966, Ser. No. 544,017
Claims priority, application France Apr. 20, 1965, 13,907
Int. Cl. H01s 3/09
U.S. Cl. 331—94.5                                    9 Claims

ABSTRACT OF THE DISCLOSURE

An apparatus to control the release of a plurality of lasers in a very precise predetermined timed relationship or simultaneously through the use of partially reflective plate means obliquely arranged with respect to the axis of the lasers and arranged in non-parallel relationship with respect to each other in order to cause the lasers to successively release at a precise predetermined interval of time or with the oblique partially reflecting plate means arranged parallel with respect to each other to cause the lasers to release simultaneously with great precision.

---

Figure 1:
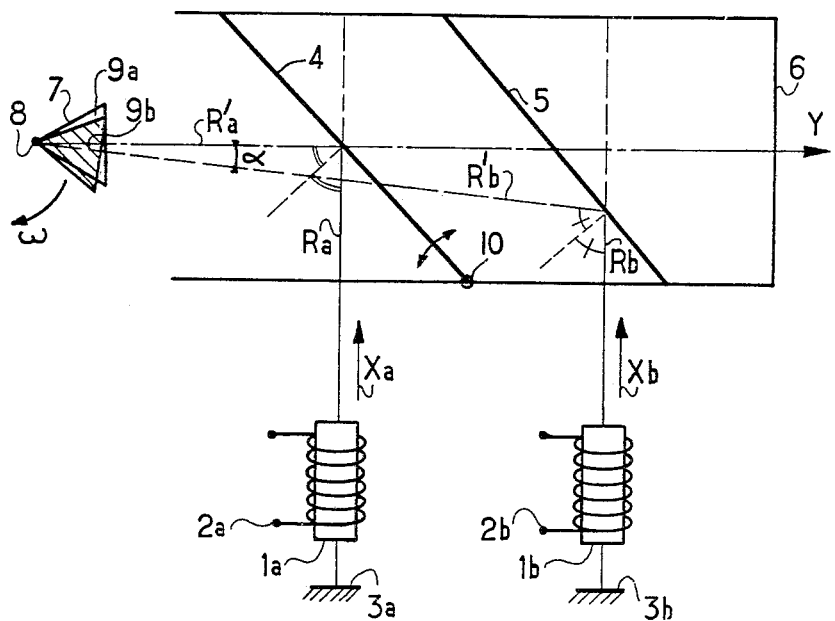

The present invention relates to apparatus for controlling a plurality of masers. More particularly, the present invention relates to an apparatus to control the release of a plurality of lasers, optical masers, according to a very precise predetermined timed relationship. More specifically, the present invention relates to an apparatus for controlling the resonant wave action of a plurality of lasers by means of coordinated mirrors and a common single element selectively preventing the laser action. The control apparatus may cause the lasers to successively release at a precise predetermined interval of time or simultaneously with a precision of a few nanoseconds.

A laser is a particular type of maser; that is, it is an optical maser. The present invention preferably relates to lasers, but the principles may be employed with other types of masers. Although the present invention is described with respect to crystal lasers, it is contemplated that the basic principles may be employed with gas lasers or injection lasers, for example.

A laser, particularly a solid laser, may have two operating conditions; (1) after an optical pumping by a flash lamp has produced a population inversion of certain atomic energy levels, the spontaneous transition and emissions will have a net amplification to produce an uncontrolled laser action, and (2) the release of the laser may be controlled to occur at a chosen instant, with a precision on the nanosecond order. Often, the second method is preferred because it permits the concentration of energy in very high powered pulses.

Several methods are known to control the release of a laser. Some of these are: (1) a Fabry-Perot resonator employing fixed mirrors constituting an optical cavity containing a crystal laser rod, which is subjected to a "pumping radiation," and an electro-optic element (Kerr's cell or Pockels' cell); the optic element prevents the laser action, until at the desired moment the cell is made transparent to the optical rays by applying a suitable electric voltage to it so that there will be a large net amplification to produce a laser pulse; (2) an optical cavity containing an opaque material barrier that is burned by an electric current passing through it to produce a laser action similar to the optic element of (1); (3) an optical cavity containing a fixed mirror and a rotating mirror (for example, a totally reflective prism) which provides the second mirror of the resonant cavity at one precise angular position of the rotating reflecting element. At this position, the photons traveling perpendicular to the plane of the mirror would form a wave that would be reflected between the mirrors and increase in intensity with each succeeding passage until it was strong enough to burst through one of the mirrors as a flash of coherent light, i.e., a laser.

To successively release several lasers in a predetermined order, it is possible to successively control several individual elements of one of the preceding types. However, it is relatively complicated to obtain a close precision in the series release. In particular, it is proved to be extremely difficult to control a simultaneous release, with the desired definition on the nanosecond order.

It is an object of the present invention to provide an apparatus for releasing a plurality of lasers in a prescribed order, with high precision.

It is another object of the present invention to obtain the release of several lasers according to a predetermined order, particularly simultaneously, by providing several optical cavities, each containing a laser producing crystal, which are united with a common releasing device.

It is an additional object of the present invention to provide an apparatus employing $n$ lasers operatively coordinated with $n-1$ semireflecting plates, and a common releasing element to obtain the release of the lasers in a predetermined order.

A more specific object of the present invention is to provide an apparatus for releasing a plurality of lasers in a prescribed order, employing an optical cavity-type laser producing element operatively coordinated with $n-1$ semireflecting plates, a stationary reflecting mirror, and a rotating reflector.

Figure 2:
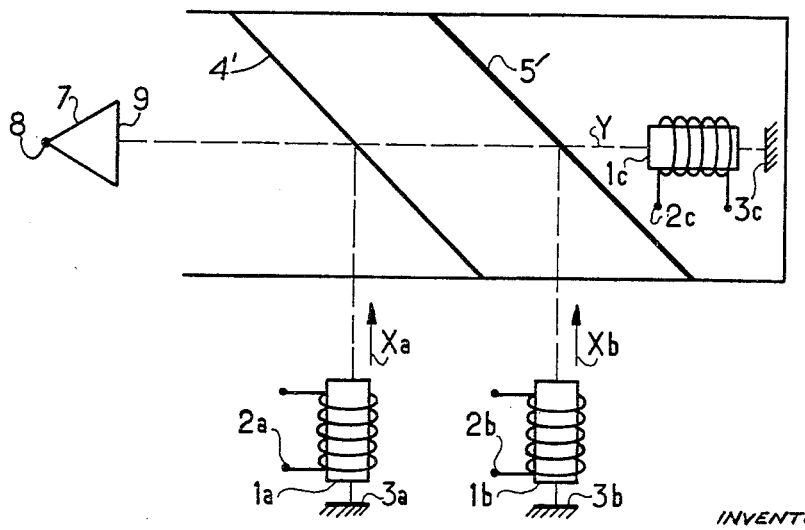

Further objects, features and advantages of the present invention will appear from the following specification in connection with the description of the accompanying drawing, in which:

FIGURE 1 is a schematic representation of an apparatus according to the present invention for producing the successive release of two lasers at precise timed intervals; and FIGURE 2 is a schematic representation of another embodiment of the present invention for producing the simultaneous release of three separate lasers.

FIGURE 1 shows two laser crystals 1a and 1b, having flash lamps 2a and 2b, and partially reflecting mirrors 3a and 3b, respectively. The apparatus employs a semireflecting plate 4, a totally reflecting mirror 5, both of which are mounted in a housing 6 having an axis Y. A totally reflecting prism 7 is mounted for rotation about an axis 8, which lies on the axis Y. The prism 7 is shown in two different angular positions 9a and 9b, with two corresponding different positions of the entrance face.

The flash lamps 2a and 2b are of conventional construction and suitably connected to a source of electrical energy (not shown). The axes Xa and Xb of the crystals 1a and 1b, respectively, are parallel. This is the preferred arrangement shown as an example; the laser axes can have any angle between them and the ray trajectories can be corrected by auxiliary reflecting devices. The angular relationship of the plates 4 and 5 with respect to the Y axis of the mounting can be adjusted by any suitable mechanical means (not shown). For example, the plates 4 and 5 could be pivotally mounted at one end as shown at 10 and adjusted by means of a screw at the upper end. Although laser crystals, for example, ruby laser crystals, are employed, it is contemplated that other types of laser producing elements may be used, for example, gas laser elements or semiconductor injection type lasers. Although flash tubes are preferably used, it is contemplated that the laser elements may be pumped by solar energy or chemical means. Also, it is contemplated that other devices such as a totally reflective mirror and an electro-optic element or opaque material obstacle, as mentioned above, may be employed instead of the illustrated prism 7.

For the position 9a of the totally reflecting prism 7, a ray Ra emitted along the Xa axis is reflected by the plate 4 as ray R'a, which is reflected by the prism 7 and returned along the same trajectory to the crystal 1a where it may be reflected by the fixed mirror 3a. With the total reflection prism in the 9a position, a resonating optical cavity is established between the prism 7 and the mirror 3a so that a laser action may be produced. In this position, a wave of photons will be reflected between the prism 7 and the mirror 3a to amplify the wave until the energy is great enough to burst through the partially reflecting mirror 3a and produce a laser.

In a similar manner, when the total reflection prism 7 is in the 9b position, the other laser will be released from the resonating cavity formed by the prism 7 and the mirror 3b.

With the axes of the lasers being parallel as shown in FIGURE 1, the angle $\alpha$ between the positions 9a and 9b of the prism 7 is equal to the angle between the plates 4 and 5. If the total reflection prism rotates at an angular velocity $\omega$, the release of lasers from crystals 1a and 1b will be spaced at $\alpha/\omega$ second intervals.

If the mirrors 4 and 5 are parallel, or if the light beam trajectory is suitably corrected by auxiliary mirrors, the two lasers will be released at the same time. For simplicity, only two lasers have been shown, but it is within the scope of the invention to employ any desired number of lasers.

The apparatus of FIGURE 2 is the same as the apparatus of FIGURE 1, except an additional laser crystal rod 1c, a flash lamp 2c, and a mirror 3c have been added along the Y axis of the mounting to cooperate with the laser crystals 1a and 1b. In addition, instead of the totally reflecting mirror 5 of FIGURE 1, FIGURE 2 employs a partially reflecting and partially transparent mirror 5'. The plates, or mirrors, 4' and 5' may be adjusted to any suitable angle, similar to the mirrors 4 and 5 of FIGURE 1. The operation of the laser crystals 1a and 1b in FIGURE 2 is the same as the operation of the laser crystals 1a and 1b in FIGURE 1.

If the mirrors 4 and 5' are adjusted to be parallel and inclined at a 45 degree angle with respect to the Y axis, the three lasers will be released at the same time when the prism 7 is in the position 9. Also, with a suitable adjustment of the mirrors 4 and 5', the three lasers may be released in a prescribed order at predetermined intervals.

The foregoing embodiments and examples are for purposes of illustration only, and further modifications in various respects will be possible within the scope and spirit of the invention as disclosed above in the specification.

We claim:

1. A control device for the release of several lasers, in a predetermined order, comprising: a plurality of laser crystals, each having an optical pumping means and a partially transparent stationary mirror means at one end operable to reflect electromagnetic waves along the axis of the corresponding laser crystal; rotating mirror means; partially reflecting plate means operatively associated with each of said laser crystals opposite from said stationary mirror means and being operable to reflect the waves from along the axis of the corresponding crystals to said rotating mirror means; one of said partially reflecting plate means associated with one of said laser crystals being in non-parallel relationship in one position to said partially reflecting plate means associated with the other of said laser crystals and said rotating mirror means being operable at a predetermined rotated position with respect to each of said crystals to form a resonating optical cavity with each of said laser crystals, the corresponding stationary mirror means and the corresponding plate means for wave amplification that permits the laser release.

2. The device of claim 1, wherein there is a single position of said rotating mirror means that will form the resonating optical cavity with all of said laser crystals, the corresponding stationary mirror means, and with the corresponding plate means at another position.

3. The device of claim 1, including an additional laser crystal having an optical pumping means and a corresponding stationary mirror means; said additional laser crystal being mounted to emit electromagnetic waves in a straight line from its stationary mirror, along its axis, through at least one of said partially reflecting plate means, and to said rotating mirror means.

4. The device of claim 1, wherein there are $n$ lasers, and $n-1$ partially reflective plate means obliquely arranged with respect to the axes of $n-1$ lasers, respectively.

5. The device of claim 4, wherein the laser wave emitted from a first one of said lasers is reflected by a corresponding first one of said partially reflective plate means to said rotating mirror means, a second one of said partially reflective plate means obliquely arranged with respect to the axis of another laser to reflect the laser wave emitted along the axis of said other laser through said first mentioned partially reflective plate means and to said rotating mirror means.

6. The device of claim 4 including an additional laser being operable to emit electromagnetic laser waves along its axis through one of said partially reflective plate means in a straight line to said rotating mirror means.

7. The device of claim 4, wherein the lasers are released only from each of said partially transparent stationary mirror means.

8. The device of claim 4, wherein said partially reflective plate means is operable to selectively vary the relative angles between said $n-1$ partially reflective plate means.

9. The device of claim 1, wherein said partially reflective plate means is operable to selectively vary the angle between the paths of said laser waves intersecting said rotating mirror means.

References Cited

UNITED STATES PATENTS

| 3,229,095 | 1/1966 | Lasher et al. | 331—94.5 X |
| 3,292,102 | 12/1966 | Byrne | 331—94.5 |
| 3,310,753 | 3/1967 | Burkhalter | 331—94.5 |
| 3,398,379 | 8/1968 | Sims et al. | 331—94.5 |

JEWELL H. PEDERSEN, Primary Examiner

T. MAJOR, Assistant Examiner